UNITED STATES PATENT OFFICE.

JOSEPH ROSENHEK, OF MAINKUR, NEAR FRANKFORT-ON-THE-MAIN, ASSIGNOR TO LEOPOLD CASSELLA & CO., OF FRANKFORT-ON-THE-MAIN, GERMANY.

PRODUCTION OF YELLOW DYE-STUFFS.

SPECIFICATION forming part of Letters Patent No. 412,978, dated October 15, 1889.

Application filed April 12, 1889. Serial No. 306,998. (Specimens.) Patented in France October 16, 1888, No. 193,582.

*To all whom it may concern:*

Be it known that I, JOSEPH ROSENHEK, doctor of philosophy, a citizen of the Empire of Germany, and a resident of Mainkur, near Frankfort-on-the-Main, Germany, have invented new and useful Improvements in the Production of new Yellow Dye-Stuffs, (for which I have obtained French Patent No. 193,582, dated October 16, 1888,) of which the following is a specification.

It is known that paratoluidine heated with sulphur is transformed into bases which contain sulphur, (Dahl & Co.'s German patent, No. 35,790.) The nature of the product formed is altered by the proportional quantity of sulphur employed, (Dahl & Co.'s German patent application, D 3,362.) While the so-called "thioparatoluidine" of Dahl & Co. is soluble in spirit and may be obtained by crystallization, the product becomes insoluble in spirit when the quantity of sulphur is increased. Almost the same reactions take place when, instead of paratoluidine, xylidine is used. The thionated bases therefrom have first been mentioned in Leopold Cassella & Co.'s German patent application dated October 3, 1888.

The nature of my invention consists in having ascertained and discovered the following facts: First, the thionated primary bases from paratoluidine and xylidine can be easily transformed into tertiary bases by alkylating or benzylating the same; second, the products resulting from this process yield to water the salts of tertiary bases which dye mordanted cotton a bright-yellow shade, which I name "Thioflavine T."

In order to produce my alkylated bases, I can use all the methods which are generally known in chemistry as fit for this purpose—as, for instance, treating with halogenes of alkyles, with or without pressure, or with an acid and an alcohol, or with an alcohol alone.

In the following I describe how my invention may be put into practice.

Example: In a closed autoclave I heat twenty-four kilos of the thionated base from paratoluidine with thirty kilos of methyl alcohol and twelve kilos muriatic acid (of 1.16 specific gravity) during ten to twelve hours up to 160° to 170° centigrade. The autoclave will be found to be filled with crystals of the chlorhydrate. When these crystals are boiled with water, a part thereof, the quantity of which varies according to the nature of the primary base employed, will be dissolved, and after filtration is precipitated by addition of common salt. Thus I obtain a coloring-matter of basic nature which dyes cotton mordanted with tannin and tartar emetic a bright yellow.

In the place of muriatic acid I may use thirteen kilos of benzyl chloride and heat only up to 120° to 150° centigrade.

Instead of reacting upon the direct products of the thionation of paratoluidine and xylidine, I can also act upon the bases purified with alcohol or another extracting solvent.

I obtain my new color as a yellow crystalline powder, the chlorhydrate of a yellow basic compound. The latter can be precipitated from the aqueous solution of the chlorhydrate by addition of alkalies or of acetates. The base is a yellow powder difficultly soluble in water, more easily soluble in alcohol. The sulphate and the nitrate are less soluble in water than the chlorhydrate. The tannate is scarcely soluble in water. The coloring-matter dyes mordanted cotton a bright yellow. It is well adapted for printing cotton goods. It dyes wool in neutral baths, and silk in acidulated or neutral baths, with a very characteristic greenish fluorescence in light shades.

What I claim as new, and desire to secure by Letters Patent, is—

As a new article of manufacture, the coloring-matter obtained by introducing alcohol radicals into the primary thionated bases from paratoluidine and xylidine, which as chlorhydrate is soluble in water, alcohol, and diluted acid, and dyes mordanted cotton a bright yellow.

In testimony that I claim the foregoing as my invention I have signed my name, in presence of two witnesses, this 22d day of March, 1889.

JOSEPH ROSENHEK.

Witnesses:
ALVESTO P. HOGUE,
JEAN GRUND.